US012451574B2

(12) United States Patent
Gao et al.

(10) Patent No.: US 12,451,574 B2
(45) Date of Patent: Oct. 21, 2025

(54) CAVITY FILTER

(71) Applicant: Suzhou Luxshare Technology Co., Ltd., Suzhou (CN)

(72) Inventors: Guiping Gao, Suzhou (CN); Shaodong Li, Suzhou (CN); Xinghua Sun, Suzhou (CN)

(73) Assignee: Suzhou Luxshare Technology Co., Ltd., Suzhou (CN)

( * ) Notice: Subject to any disclaimer, the term of this patent is extended or adjusted under 35 U.S.C. 154(b) by 166 days.

(21) Appl. No.: 18/239,276

(22) Filed: Aug. 29, 2023

(65) Prior Publication Data

US 2024/0128623 A1 Apr. 18, 2024

(30) Foreign Application Priority Data

Oct. 14, 2022 (CN) ........................ 202211261869.2

(51) Int. Cl.
*H01P 1/207* (2006.01)
*H01P 7/06* (2006.01)

(52) U.S. Cl.
CPC ................ *H01P 1/207* (2013.01); *H01P 7/06* (2013.01)

(58) Field of Classification Search
CPC .................................. H01P 7/06; H01P 1/207
USPC .................................................. 333/208–212
See application file for complete search history.

(56) References Cited

FOREIGN PATENT DOCUMENTS

| | | | | |
|---|---|---|---|---|
| CL | 113346215 | A | | 9/2021 |
| CN | 106992343 | A | * | 7/2017 |
| CN | 214672910 | U | | 11/2021 |
| CN | 214957291 | U | | 11/2021 |
| CN | 113113743 | B | | 6/2022 |
| CN | 218788493 | U | | 4/2023 |

* cited by examiner

*Primary Examiner* — Rakesh B Patel
(74) *Attorney, Agent, or Firm* — Birch, Stewart, Kolasch & Birch, LLP

(57) ABSTRACT

The embodiments of the disclosure discloses an cavity filter in which a sealed resonant cavity is formed by using an adjusting end cover and a body, and a positional relationship between the resonator and the adjusting end cover is changed by using a deformable adjusting end cover. Therefore, during the adjustment of the performance parameters of the cavity filter, the resonant cavity may be kept clean, so as to prevent metal debris or external dust from entering the resonant cavity and affecting the filtering performance of the cavity filter. The adjusting end cover is configured to be driven by the driving body to produce a deformation relative to the resonator. The parameter adjustment range of the cavity filter is improved, so that the cavity filter may adapt to more frequency bands, thereby improving the communication quality of the communication device.

9 Claims, 4 Drawing Sheets

Prior Art

CAVITY FILTER

CLAIM OF PRIORITY AND CROSS-REFERENCE TO RELATED APPLICATION(S)

This application claims the benefit of Chinese Patent Application No. 202211261869.2, filed on Oct. 14, 2022, which is incorporated herein by reference in its entirety.

BACKGROUND OF THE INVENTION

1. Field of the Invention

The invention relates to the field of filters, and in particular to a cavity filter.

2. Description of the Related Art

During the installation and debugging of a cavity filter, an adjusting screw will be inserted deep into a resonant cavity, and the filtering performance parameters of the cavity filter will be adjusted by changing the insertion depth of the adjusting screw in the resonant cavity. However, during this process, metal debris and foreign impurities are easily brought into the resonant cavity, thereby affecting the filtering performance of the cavity filter.

BRIEF DESCRIPTION OF THE INVENTION

In view of this, an embodiment of the present disclosure provides a cavity filter, which uses a deformable adjusting end cover to change the volume of the resonant cavity, thereby realizing the adjustment of the filtering performance of the cavity filter and ensuring the cleanliness of the resonant cavity in the process.

The cavity filter in the embodiment of the present disclosure includes:

- a housing, including a body and an adjusting end cover, where the body and the adjusting end cover form a resonant cavity, and the adjusting end cover has a deformable region;
- a resonator installed in the resonant cavity, opposite to the deformable region and spaced a predetermined distance from the deformable region; and
- a driving assembly, including a driving body, where the driving body is connected to a side of the deformable region away from the resonant cavity and operatively drives the deformable region to move toward and away from the resonator.

Further, the adjusting end cover further includes a fixing region arranged around the deformable region and the adjusting end cover may be fastened on the body through the fixing region;

- the driving assembly further includes a support member, the support member is fixed to the adjusting end cover through the fixing region, the support member has a constraining part, and the constraining part is adapted to the driving body and has at least one constraint position in the movement stroke of the driving body.

Further, the support member further includes a first connecting plate, an outer edge of the first connecting plate is fixedly connected with the fixing region, and the constraining part is arranged at the center of the first connecting plate and protrudes toward a side of the first connecting plate away from the deformable region;

- the driving body is connected to the center of the deformable region.

Further, the constraining part has a threaded hole, and the driving body is an adjusting screw corresponding to the threaded hole;

- the adjusting screw has a connecting end which is connected to the adjusting end cover and also has a degree of freedom of rotation.

Further, the support member further includes a second connecting plate, the second connecting plate is a flat plate and has a threaded hole, and an outer edge of the second connecting plate is fixedly connected with the fixing region;

- the constraining part includes an adjusting nut corresponding to the adjusting screw, the adjusting nut is placed on a side of the second connecting plate away from the adjusting end cover, and the adjusting screw passes through the threaded hole to fit with the adjusting nut.

Further, the connecting end has a positioning boss, and the positioning boss protrudes in a circumferential direction of the connecting end;

- the driving assembly further includes a position-limiting collar, the position-limiting collar has a positioning groove on a side facing the adjusting end cover, the position-limiting collar is sleeved over the adjusting screw and connects the adjusting screw to the adjusting end cover through the cooperation of the positioning groove and the positioning boss.

Further, the adjusting end cover further includes an annular flange, and the annular flange protrudes on the side of the deformable region away from the resonant cavity;

- the position-limiting collar is clamped on an inner side of the annular flange, and the position-limiting collar has an interference with the opposite side of the annular flange.

Further, when the support member is fixed to the adjusting end cover, there is a gap between the annular flange and the support member.

Further, the deformable region and the fixing region are integrally formed.

Further, the resonator includes a connection section and an extension section, the connection section is connected to the body, and the extension section faces the outer circumference of the resonator and corresponds to at least part of the deformable region.

In the cavity filter of the embodiment of the present disclosure, a sealed resonant cavity is formed by using the adjusting end cover and the body, and the positional relationship between the resonator and the adjusting end cover is changed by using the deformable adjusting end cover. Therefore, during the adjustment of the performance parameters of the cavity filter, the resonant cavity may be kept clean, so as to prevent metal debris or external dust from entering the resonant cavity and affecting the filtering performance of the cavity filter. The adjusting end cover is configured to be driven by the driving body to produce a deformation relative to the resonator. The parameter adjustment range of the cavity filter is improved, so that the cavity filter may adapt to more frequency bands.

BRIEF DESCRIPTION OF THE DRAWINGS

The foregoing and other objectives, features and advantages of the present disclosure will become more apparent from the following description of embodiments of the present disclosure with reference to the accompanying drawings, in which.

DETAILED DESCRIPTION OF EMBODIMENTS OF THE INVENTION

The present disclosure is described below based on embodiments, but the present disclosure is not only limited to these embodiments. In the following detailed description of the present disclosure, some specific details are described in detail. The present disclosure may be fully understood by those skilled in the art without the description of these detailed parts. In order to avoid confusing the substance of the present disclosure, well-known methods, processes, flows, elements and circuits are not described in detail.

In addition, it should be understood by those of ordinary skill in the art that the drawings provided herein are for illustrative purposes, and the drawings are not necessarily drawn to scale.

In the description of the present disclosure, it should be understood that the terms “first”, “second”, and the like are merely used for descriptive purposes, but cannot be understand as indicating or implying relative importance. Moreover, in the description of the present disclosure, unless otherwise stated, “a plurality of” means two or more.

Unless otherwise specified and limited, the terms “mounted”. “connected”, “connection”, “fixed”, and the like should be understood broadly. For example, the “connection” may be a fixed connection, a detachable connection, or an integrated connection, may be a direct connection or an indirect connection by means of an intermediate medium, or may be an internal connection of two elements or an interaction between two elements. For those of ordinary skill in the art, the specific meanings of the terms in the present disclosure may be understood according to specific situations.

Figure 1:
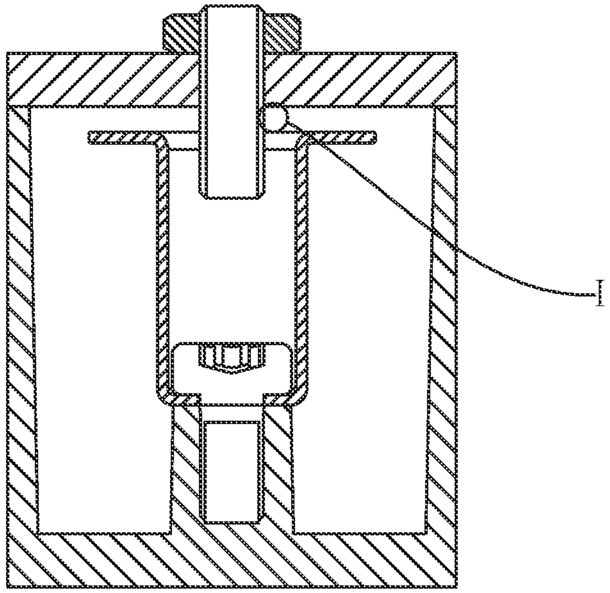
FIG. 1 is a schematic structural diagram of a cavity filter in the prior art.

FIG. 1 is a schematic structural diagram of a cavity filter in the prior art. In the cavity filter in the figure, the filtering performance of the cavity filter is adjusted by changing the length of the adjusting screw inserted deep into the resonant cavity 13. However, during this process, as the adjusting screw is screwed in and out, the adjusting screw will bring dirt or dust at the bottom of the thread into the resonant cavity 13. Furthermore, metal debris may also appear during the threading process or during the interlocking process of the internal and external threads, and the metal debris may also be brought into the resonant cavity 13 as the adjusting screw is screwed in (as shown in region I).

Figure 2:
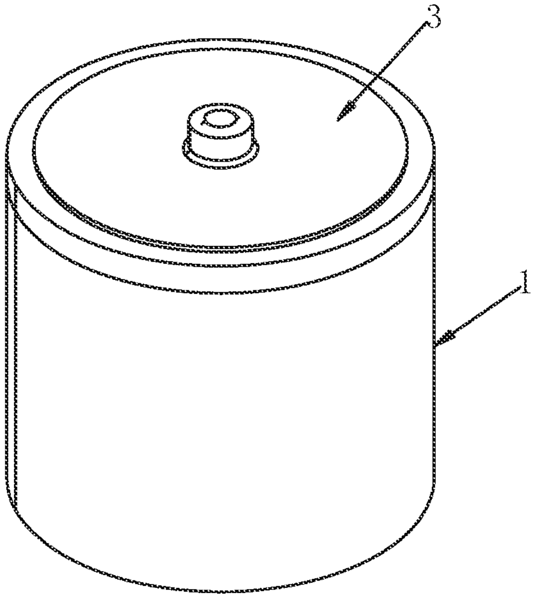
FIG. 2 is a schematic structural diagram of a cavity filter according to an embodiment of the present disclosure.
Figure 3:
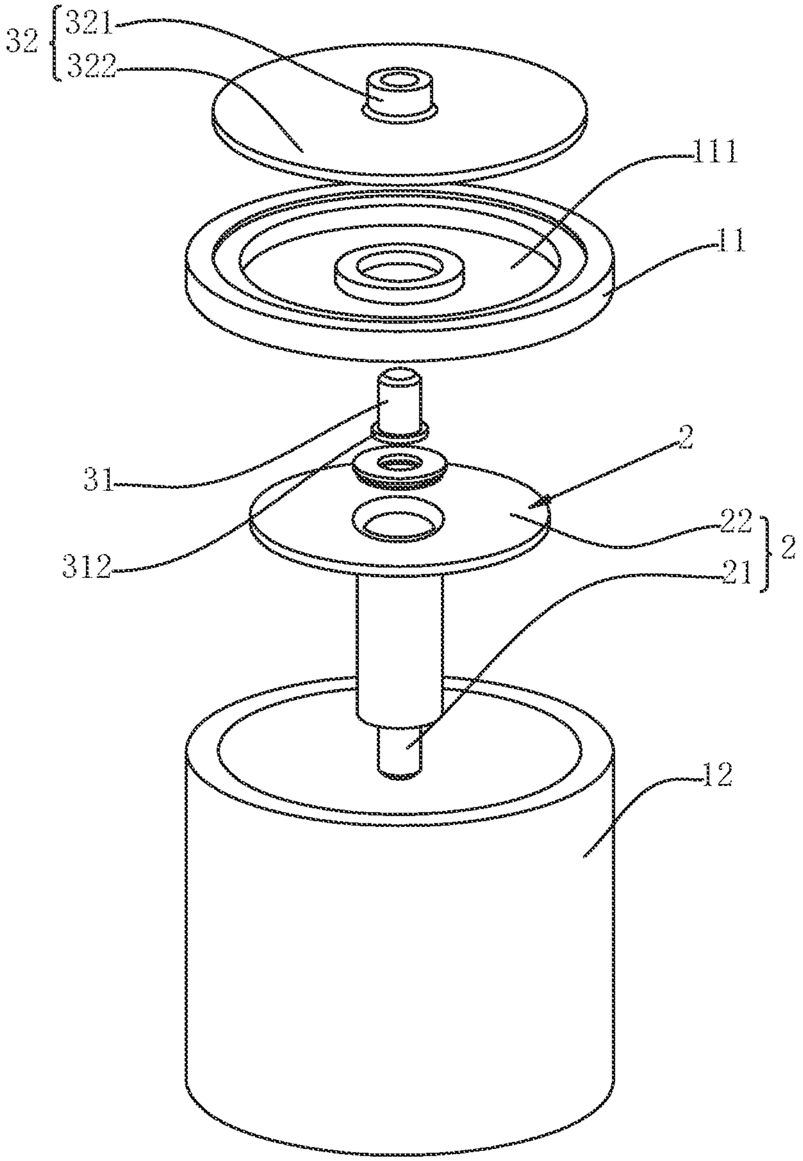
FIG. 3 is a schematic exploded diagram of the cavity filter according to the embodiment of the present disclosure.
Figure 4:
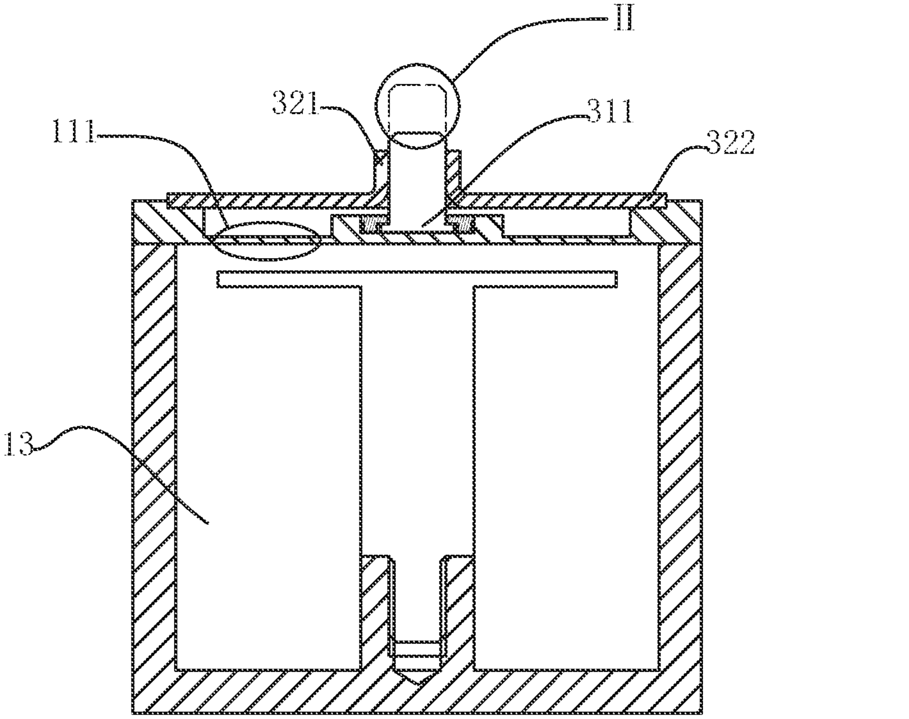
FIG. 4 is a schematic cross-sectional diagram of the cavity filter according to the embodiment of the present disclosure in some examples.
Figure 5:
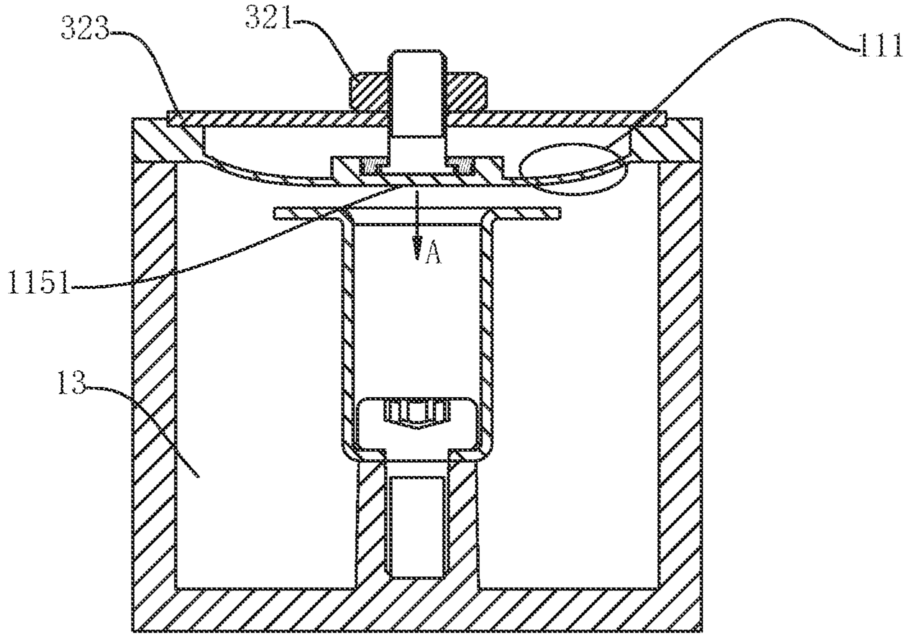
FIG. 5 is a schematic cross-sectional diagram of the cavity filter according to the embodiment of the present disclosure in other examples.
Figure 6:
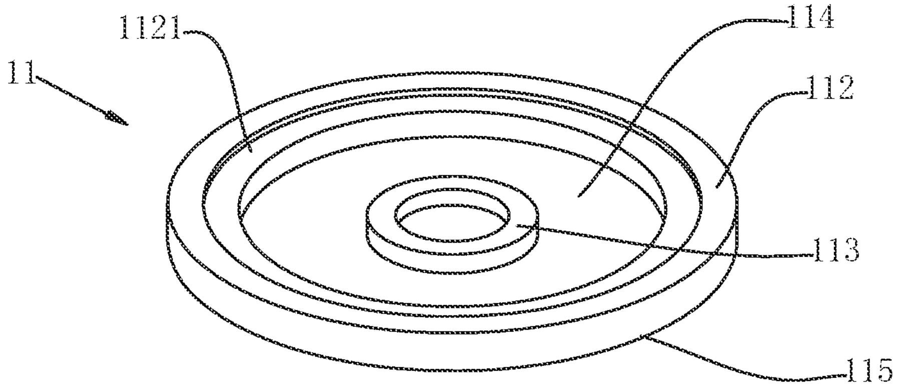
FIG. 6 is a schematic structural diagram of an adjusting end cover according to an embodiment of the present disclosure.

FIGS. 2 and 3 respectively are a schematic structural diagram and schematic exploded diagram of the cavity filter. FIGS. 4-5 are schematic diagrams of cavity filters in different structural forms. The resonators 2 in the two figures each have an extension section 22 extending toward the side wall of the resonant cavity 13, but are different in the form of the middle section located at the center of the resonator 2 and connected to the extension section 22. The middle section in FIG. 4 is a solid structure, and the middle section in FIG. 5 is a thin-walled structure. FIG. 6 is a schematic structural diagram of the adjusting end cover 11. As shown in FIGS. 2-6, the adjusting end cover 11 and the body 12 form a sealed region, which may prevent dust from falling into the sealed region. The adjusting end cover 11 has a concave region, which is thinner than other positions, and when driven by the driving body 31, the adjusting end cover 11 will be deformed.

In some examples, as shown in FIGS. 1-6, the cavity filter includes a housing 1, a resonator 2 and a driving assembly 3. The housing 1 includes a body 12 and an adjusting end cover 11, the body 12 and the adjusting end cover 11 form a resonant cavity 13, and the adjusting end cover 11 has a deformable region 111. The resonator 2 is installed in the resonant cavity 13 and at a position opposite to the deformable region 111. The resonator 2 has a predetermined distance from the adjusting end cover 11. The driving assembly 3 includes a driving body 31 and the driving body 31 is connected to a side of the deformable region 111 away from the resonant cavity 13 and operatively drives the deformable region 111 to move toward and away from the resonator 2.

In this embodiment, the adjusting end cover 11 is in a flat state or roughly in a flat state when not pushed and pulled by the driving body 31. When the adjusting end cover 11 is pushed and pulled by the driving body 31, the deformable region 111 will be deformed, and the deformation may change the distance between the adjusting end cover 11 and the resonator 2, that is, change the volume of the resonant cavity 13. Moreover, the area of the deformable region 111 may be selected according to the magnitude of performance adjustment of the cavity filter. For example, when the cavity filter needs to meet the requirements of filtering in more frequency bands, the deformable region 111 may be configured with a large area, so as to meet the adjustment requirement.

Optionally, the type of deformation generated by the deformable region 111 includes elastic deformation or plastic deformation. In order to make the adjusting end cover 11 deform repeatedly to meet the requirements of the cavity filter for performance parameter adjustment, the type of deformation may be configured as elastic deformation, and the deformation magnitude may be controlled within a certain range, thereby avoiding cracks or even fractures in the deformable region 111 during the repeated deformation of the adjusting end cover 11.

In the cavity filter and communication device of the embodiment of the present disclosure, a sealed resonant cavity 13 is formed by using the adjusting end cover 11 and the body 12, and the positional relationship between the resonator 2 and the adjusting end cover 11 is changed by using the deformable adjusting end cover 11. Therefore, during the adjustment of the performance parameters of the cavity filter, the resonant cavity 13 may be kept clean, so as to prevent metal debris or external dust from entering the resonant cavity 13 and affecting the filtering performance of the cavity filter. The adjusting end cover 11 is configured to be driven by the driving body 31 to produce a deformation relative to the resonator 2. The parameter adjustment range of the cavity filter is improved, so that the cavity filter may adapt to more frequency bands, thereby improving the communication quality of the communication device.

In some examples, as shown in FIGS. 1-6, the adjusting end cover 11 further includes a fixing region 112 arranged around the deformable region 111, and the adjusting end cover 11 may be fastened on the body 12 through the fixing region 112. The driving assembly 3 further includes a support member 32, the support member 32 is fixed to the adjusting end cover 11 through the fixing region 112, the support member 32 has a constraining part 321, and the constraining part 321 is adapted to the driving body 31 and has at least one constraint position in the movement stroke of the driving body 31.

In this embodiment, the fixing region 112 is configured to connect the adjusting end cover 11 to the body 12, so the fixing region 112 has a certain thickness on the adjusting end cover 11, so as to facilitate the connection between the adjusting end cover 11 and the body 12. The connection may be screwed connection, welded connection or anchored connection. However, after the adjusting end cover 11 and the body 12 are connected, the electrical performance on the housing 1 should be ensured.

Specifically, FIG. 2 shows a form of housing 1, in which the body 12 is a barrel-shaped part, the resonator 2 is installed at the bottom of the barrel-shaped part, and the opening of the barrel-shaped part is connected to the fixing region 112. After the adjusting end cover 11 is fastened on the barrel, the housing 1 is roughly cylindrical in shape.

In this embodiment, the constraining part 321 and the driving body 31 are arranged in pairs, that is, the forms of the constraining part 321 and the driving body 31 may match each other. For example, when the driving body 31 passes through the constraining part 321, a plurality of retractable balls or tabs are arranged on the side of the driving body 31, and in contrast, a plurality of positioning holes are formed in the constraining part 321. When the driving body 31 moves to a designated position, the ball goes deep into the positioning hole to complete the positioning of the driving body 31. For another example, a plurality of positioning holes are formed in both the constraining part 321 and the driving member, and the driving assembly 3 is also equipped with positioning clips corresponding to the positioning holes. When the driving body 31 moves to a designated position, the positioning clips are inserted into the corresponding positioning holes of the constraining part 321 and the driving member simultaneously, and then the driving body 31 may be positioned.

In some examples, as shown in FIGS. 1-6, the support member 32 further includes a first connecting plate 322, the outer edge of the first connecting plate 322 is fixedly connected to the fixing region 112, and the constraining part 321 is arranged at the center of the first connecting plate 322 and protrudes toward a side of the first connecting plate 322 away from the deformable region 111. The driving body 31 is connected to the center of the deformable region 111. In this embodiment, the constraining part 321 protrudes toward the outside of the cavity filter, so that the distance between the first connecting plate 322 and the adjusting end cover 11 may be closer, thereby making the size of the cavity filter smaller.

Optionally, the first connecting plate 322 may be produced from a flat plate, and a hole is punched in the middle area of the flat plate, and then the position is stamped or extruded to form a raised flange structure facing one side of the plane, and a matching structure corresponding to the driving body 31 is formed at the raised flange position.

In some examples, as shown in FIGS. 1-6, the constraining part 321 has a threaded hole, and the driving body 31 is an adjusting screw corresponding to the threaded hole. The adjusting screw has a connecting end 311 which is connected to the adjusting end cover 11 and also has a degree of freedom of rotation. In this embodiment, the deformation of the adjusting end cover 11 may be controlled by screwing the adjusting screw in and out. When the volume of the resonant cavity 13 needs to be increased, the adjusting screw is screwed out toward the outside of the cavity filter, and vice versa. During this process, the adjusting screw will rotate along the axis, and accordingly the bottom of the adjusting screw will also rotate relative to the adjusting end cover 11. In order to reduce the friction between the adjusting screw and the adjusting end cover, the surface roughness at the connecting position between the adjusting screw and the adjusting end cover 11 may be correspondingly reduced. This adjustment has the following effects.

First, those skilled in the art may change the deformation magnitude of the deformable region 111 by operating the rotation of the adjusting screw, so as to ensure accurate control over the deformation. For example, by observing and measuring how much the adjusting screw is exposed in the top region of the constraining part 321 (shown as region II in FIG. 4), the current distance from the adjusting screw to the resonator 2 may be determined. Thus, the problem that the cavity filter is shorted when the adjusting screw is screwed in too much and comes into contact with the resonator 2 may be avoided.

Second, in order to ensure the electrical properties of the housing 1, the deformable region 111 should not be too thin. On this premise, in order to generate sufficient deformation in the deformable region 111, the driving assembly 3 needs to provide a relatively large push-pull force. In this case, the use of threaded fit may ensure sufficient push-pull force. When the thickness of the deformable region 111 is relatively large, the operator may use a tool such as a wrench with a longer torque to rotate the adjusting screw.

In other examples, as shown in FIGS. 1-6, the support member 32 further includes a second connecting plate 323, the second connecting plate 323 is a flat plate and has a threaded hole, and the outer edge of the second connecting plate 323 is fixedly connected to the fixing region 112. The constraining part 321 includes an adjusting nut 324 corresponding to the adjusting screw, the adjusting nut 324 is placed on a side of the second connecting plate 323 away from the adjusting end cover 11, and the adjusting screw passes through the threaded hole to fit with the adjusting nut 324. In this embodiment, the adjusting nut 324 is used to fit with the adjusting screw, which simplifies the overall structure of the support member 32. Moreover, it may also ensure that the internal thread of sufficient length fits with the external thread of the adjusting screw.

Specifically, in this embodiment, the thread pitch of the threaded hole and the thread pitch of the adjusting nut 324 are also set to be the same, so as to ensure that the adjusting screw may move the same stroke relative to the threaded hole and the adjusting nut when rotating at the same angle.

It is easy to understand that in the above two embodiments, the supporting force provided by the support member 32 is used to move the adjusting screw up and down. Therefore, it is required to ensure that the first connecting plate 322 and the second connecting plate 323 have a certain rigidity, so as to avoid deformation of the support member 32 prior to the adjusting end cover 11 during the process of screwing in and out.

Figure 7:
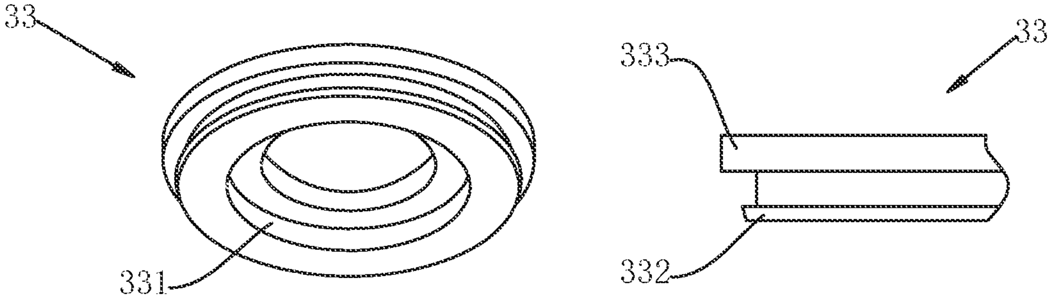
FIG. 7 is a schematic structural diagram of a position-limiting collar according to an embodiment of the present disclosure.

FIG. 7 is a schematic structural diagram of a position-limiting collar 33. In some examples, as shown in FIGS. 1-7, the connecting end 311 has a positioning boss 312, and the positioning boss 312 protrudes in the circumferential direction of the connecting end 311. The driving assembly 3 further includes a position-limiting collar 33, the position-limiting collar 33 has a positioning groove 331 on a side facing the adjusting end cover 11, the position-limiting collar 33 is sleeved over the adjusting screw and connects the adjusting screw to the adjusting end cover 1I through the cooperation of the positioning groove 331 and the positioning boss 312. In this embodiment, the adjusting screw is used to pull the adjusting end cover 11 through the cooperation of the positioning boss 312 and the position-limiting collar 33. When the volume of the resonant cavity 13 is small, the deformable region 111 may be pulled toward the outside of the cavity filter by the adjusting screw.

Further, the adjusting end cover 11 further includes an annular flange 113, and the annular flange 113 protrudes on the side of the deformable region 111 away from the resonant cavity 13. The position-limiting collar 33 is clamped on an inner side of the annular flange 113, and the position-limiting collar 33 has an interference with the opposite side of the annular flange 113. In this embodiment, the position-limiting collar 33 may be pressed into the annular flange 113 by a crimping machine. The position-limiting collar 33 is held tightly by the annular flange 113 in the horizontal direction, which ensures that the position-limiting collar 33 may limit the position of the positioning boss 312 and the positioning boss 312 does not get loose.

Specifically, as shown in the right diagram of FIG. 7, the position-limiting collar 33 also has a first positioning edge 332 and a second positioning edge 333 in the lateral direction, and the two positioning edges are in interference fit with the inner side of the annular flange 113. The outer diameter of the first positioning edge 332 is slightly smaller than the outer diameter of the second positioning edge 333, and a side surface of the first positioning edge 332 is an inclined plane. Through the cooperation of the inclined surface and the two positioning edges, the position-limiting collar 33 may be pressed into the annular flange 113 conveniently so as to achieve a guiding effect during the pressing process.

In some examples, as shown in FIGS. 1-7, when the support member 32 is fixed to the adjusting end cover 11, there is a gap between the annular flange 113 and the support member 32. Considering that the adjusting screw will drive the adjusting end cover 11 to deform outwardly when the volume of the resonant cavity 13 is increased, so a space is reserved between the annular flange 113 and the support member 32 in this embodiment. This space may ensure that the annular flange 113 will not easily collide with the support member 32 during the above process.

In some examples, as shown in FIGS. 1-7, the adjusting end cover 11 includes a first surface 114 and a second surface 115 facing away from each other. The second surface 115 is located on a side facing the resonant cavity 13. The first surface 114 is recessed toward the second surface 115 to form the deformable region 111. In this embodiment, the deformable region 111 is configured to be thinner than other positions of the adjusting end cover 11, so the deformable region 111 is more likely to deform when the adjusting end cover 11 is stressed.

Optionally, a side of the fixing region 112 facing the support member 32 is provided with an annular groove 1121, and the annular groove 1121 is adjacent to the first surface 114. Outer edges of the first connecting plate 322 and the second connecting plate 323 may be clamped in the annular groove 1121 to fix the support member 32 and the adjusting end cover 11. As a result, the height of the cavity filter is further reduced, making the internal space more compact.

In some embodiments, as shown in FIGS. 1-7, the resonator 2 includes a connection section 21 and an extension section 22, the connection section 21 is connected to the body 12, and the extension section 22 faces the outer circumference of the resonator 2 and corresponds to at least part of the deformable region 111.

It is easy to understand that the resonant cavity 13 of the cavity filter may be equivalent to a parallel circuit of an inductor and a capacitor, and the resonant cavity 13 forms a resonant stage. When electromagnetic waves of different frequencies oscillate in the resonant cavity 13, the electromagnetic waves reaching the resonant frequency of the filter may be retained and the electromagnetic waves of other frequencies will be dissipated, thereby achieving the filtering function. In the above embodiments, a capacitor region of an equivalent circuit is formed between the extension section 22 and the second surface 115.

Specifically, in order to ensure the electrical properties of the capacitor region of the cavity filter, the second surface 115 is configured as a plane in this embodiment. The plane is arranged corresponding to the extension section 22 to ensure the plate area of the capacitor. Optionally, the first surface 114 is also correspondingly configured as a plane.

Further, the annular flange 113 in this embodiment is located in the middle of the deformable region 111, and when the adjusting screw drives the adjusting end cover 11 to move, the deformable region 111 may be deformed to the maximum extent. Moreover, it may also ensure that deformations in all directions are the same. The arrow A shown in FIG. 5 is the deformation direction of the adjusting end cover 11. It may be seen from the figure that the deformable region 111 is located between the fixing region 112 and the annular flange 113, and the portion of the deformable region 111 near the annular flange 113 bends downward. In contrast, the position of the annular flange 113 still maintains or substantially maintains a plane state. This position is also the position, on the inner wall of the resonant cavity 13, corresponding to the annular flange 113. The annular flange 113 makes this position have better rigidity, and moreover, the positioning boss 312 abuts against the inner side of the annular flange 113, which also enables this position to maintain a planar state. It may be seen from the figure that this position is also the central surface 1151 in the middle area of the second plane 115 in FIG. 5. Due to the central surface 1151, even if the adjusting end cover 11 is deformed, part of the plane may still face the extension section 22 to ensure the electrical properties of the capacitor region. When the adjusting screw is screwed out to the outside of the resonant cavity 13, the process is opposite to the process described above, so it will not be repeated here.

In some embodiments, as shown in FIGS. 1-7, the deformable region 111 and the fixing region 112 are integrally formed. The adjusting end cover 11 may be manufactured by subtractive manufacturing, additive manufacturing or stamping. Therefore, the deformable region 111 and the fixing region 112 are made of the same material so that the electromagnetic waves may be transmitted between the deformable region 111 and the fixing region 112 more smoothly.

In an optional example, the cavity filter in the foregoing embodiments may be applied to a communication device. The communication device in this embodiment includes, but is not limited to, one of a duplexer, a combiner, or a tower amplifier. The housing 1 may be fixed to the communication device.

In the communication device of the embodiment of the present disclosure, a sealed resonant cavity 13 is formed by using the adjusting end cover 11 and the body 12 of the cavity filter, and the positional relationship between the resonator 2 and the adjusting end cover 11 is changed by using the deformable adjusting end cover 11. Therefore, during the adjustment of the performance parameters of the cavity filter, the resonant cavity 13 may be kept clean, so as to prevent metal debris or external dust from entering the resonant cavity 13 and affecting the filtering performance of the cavity filter. The adjusting end cover 11 is configured to be driven by the driving body 31 to produce a deformation relative to the resonator 2. The parameter adjustment range of the cavity filter is improved, so that the cavity filter may adapt to more frequency bands, thereby improving the communication quality of the communication device.

The above description is only the preferred embodiment of the disclosure and is not intended to limit the disclosure, and various modifications and changes may be made in the disclosure for those skilled in the art. Any modification, equivalent replacement, improvement, and the like made within the spirit and principle of the disclosure should fall within the scope of the disclosure.

We claim:

1. A cavity filter, comprising:

a housing, comprising a body and an adjusting end cover, wherein the body and the adjusting end cover form a resonant cavity, and the adjusting end cover has a deformable region;

a resonator installed in the resonant cavity, opposite to the deformable region and spaced a predetermined distance from the deformable region; and a driving assembly, comprising a driving body, wherein the driving body is connected to a side of the deformable region away from the resonant cavity and operatively drives the deformable region to move toward and away from the resonator;

wherein the adjusting end cover further comprises a fixing region arranged around the deformable region, and the adjusting end cover is fastened on the body through the fixing region;

the driving assembly further comprises a support member, the support member is fixed to the adjusting end cover through the fixing region, the support member has a constraining part, and the constraining part is adapted to the driving body and has at least one constraint position in a movement stroke of the driving body.

2. The cavity filter according to claim 1, wherein the resonator comprises a connection section and an extension section, the connection section is connected to the body, and the extension section faces an outer circumference of the resonator and corresponds to at least part of the deformable region.

3. The cavity filter according to claim 1, wherein the support member further comprises a first connecting plate, an outer edge of the first connecting plate is fixedly connected with the fixing region, and the constraining part is arranged at a center of the first connecting plate and protrudes toward a side of the first connecting plate away from the deformable region;

the driving body is connected to a center of the deformable region.

4. The cavity filter according to claim 1, wherein the support member further comprises a second connecting plate, the second connecting plate is a flat plate and has a threaded hole, and an outer edge of the second connecting plate is fixedly connected with the fixing region;

the constraining part comprises an adjusting nut corresponding to the adjusting screw, the adjusting nut is placed on a side of the second connecting plate away from the adjusting end cover, and the adjusting screw passes through the threaded hole to fit with the adjusting nut.

5. The cavity filter according to claim 1, wherein the constraining part has a threaded hole, and the driving body is an adjusting screw corresponding to the threaded hole;

the adjusting screw has a connecting end which is connected to the adjusting end cover and also has a degree of freedom of rotation.

6. The cavity filter according to claim 5, wherein the connecting end has a positioning boss, and the positioning boss protrudes in a circumferential direction of the connecting end;

the driving assembly further comprises a position-limiting collar, the position-limiting collar has a positioning groove on a side facing the adjusting end cover, the position-limiting collar is sleeved over the adjusting screw and connects the adjusting screw to the adjusting end cover through the cooperation of the positioning groove and the positioning boss.

7. The cavity filter according to claim 6, wherein the adjusting end cover further comprises an annular flange, and the annular flange protrudes on a side of the deformable region away from the resonant cavity;

the position-limiting collar is clamped on an inner side of the annular flange, and the position-limiting collar has an interference with an opposite side of the annular flange.

8. The cavity filter according to claim 7, wherein when the support member is fixed to the adjusting end cover, there is a gap between the annular flange and the support member.

9. The cavity filter according to claim 1, wherein the deformable region and the fixing region are integrally formed.

* * * * *